(12) United States Patent
Fox et al.

(10) Patent No.: US 8,451,021 B1
(45) Date of Patent: May 28, 2013

(54) CALIBRATING ON-CHIP RESISTORS VIA A DAISY CHAIN SCHEME

(75) Inventors: Benjamin A. Fox, Rochester, MN (US);
Nathaniel J. Gibbs, Iowa City, IA (US);
Andrew B. Maki, Rochester, MN (US);
David M. Onsongo, Manor, TX (US);
Trevor J. Timpane, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/468,301

(22) Filed: May 10, 2012

(51) Int. Cl.
*H03K 19/003* (2006.01)

(52) U.S. Cl.
USPC .............................................. 326/30; 326/21

(58) Field of Classification Search
USPC ........................................ 326/30, 21, 47, 101
See application file for complete search history.

(56) References Cited

U.S. PATENT DOCUMENTS

| | | | |
|---|---|---|---|
| 6,535,047 B2 * | 3/2003 | Mughal et al. | 327/378 |
| 6,586,964 B1 | 7/2003 | Kent et al. | |
| 6,717,455 B2 | 4/2004 | Mughal et al. | |
| 6,768,393 B2 | 7/2004 | Song | |
| 7,061,266 B2 * | 6/2006 | Sagiv | 326/30 |
| 7,148,721 B2 | 12/2006 | Park | |
| 7,151,390 B2 | 12/2006 | Nguyen et al. | |
| 7,170,313 B2 | 1/2007 | Shin | |
| 7,194,559 B2 * | 3/2007 | Salmon et al. | 710/8 |
| 7,268,712 B1 | 9/2007 | Sheen | |
| 7,332,904 B1 | 2/2008 | Menkus et al. | |
| 7,408,378 B2 | 8/2008 | Best et al. | |
| 7,782,078 B2 | 8/2010 | Koo | |
| 7,915,950 B2 | 3/2011 | Rosik et al. | |
| 2007/0024317 A1 | 2/2007 | Hansen | |

OTHER PUBLICATIONS

Yoo et al., "A 1.8-V 700-Mb/s/pin 512-Mb DDR-II SDRAM With On-Die Termination and Off-Chip Driver Calibration" IEEE Journal of Solid-State Circuits, vol. 39, No. 6, pp. 941-951, Jun. 2004 [online], [retrieved on Feb. 1, 2012]. Retrieved from the Internet <URL: http://ieeexplore.ieee.org/stamp/stamp.jsp?tp=&arnumber=1302271>.

* cited by examiner

*Primary Examiner* — James H Cho
(74) *Attorney, Agent, or Firm* — Edward P. Li; Robert R. Williams (57) ABSTRACT

A method for calibrating resistors on an integrated circuit chip via a daisy chain scheme. The method comprises the step of configuring one or more links of the daisy chain scheme, wherein each of the one or more links comprises one or more master resistors and one or more slave resistors. The method further comprises the steps of calibrating at least one on-chip reference resistor, the one or more master resistors, and the one or more slave resistors via the daisy chain scheme. The method using the daisy chain scheme enables resistance of at least one off-chip reference resistor to be duplicated to multiple distant locations while maintaining a low mismatch error.

14 Claims, 7 Drawing Sheets

CALIBRATING ON-CHIP RESISTORS VIA A DAISY CHAIN SCHEME

FIELD OF THE INVENTION

The present invention relates generally to calibration of high precision resistors on an integrated circuit chip, and more particularly to calibration of high precision resistors on an integrated circuit chip via a daisy chain scheme.

BACKGROUND

In high frequency signaling applications, transmission line termination is important for high quality signal transfer. On-chip resistors are located inside a semiconductor chip for impedance matching and used as transmission line terminations for the signal transfer. Impedance mismatching of on-chip resistors has a significant effect on analog and I/O (input/output) circuits that require high precision reference resistors to maintain performance. The accuracy of on-chip resistors is so important that a calibration scheme is needed to provide accurate on-chip resistors. Current calibration schemes include an off-chip high precision resistor, a C4 (Controlled Collapse Chip Connection) connection, and a network of on-chip parallel switchable resistors as well as associated logic to determine the correct number of resistor segments.

In current standard methods of calibrating on-chip resistors, an on-chip resistor is calibrated with reference to an off-chip resistor and then a code is mirrored to all other on-chip resistors. In the C4 method, increasing the number of C4 is required to mitigate the resistor mismatch due to an increase in the across chip variation (ACV) of resistors. In one of the calibration schemes, in order to mitigate the resistor mismatch due to the ACV, the network of parallel switchable resistors on-chip along with logic to match the off-chip resistor must be duplicated at each local site.

SUMMARY

Embodiments of the present invention provide a method for calibrating resistors on an integrated circuit chip via a daisy chain scheme. The method comprises the step of configuring a link of the daisy chain scheme, wherein the link comprises one or more first master resistors and one or more first slave resistors on the integrated circuit chip, and wherein the one or more first slave resistors are located at a distance away from the one or more first master resistors. The method further comprises the step of calibrating at least one on-chip reference resistor with reference to at least one off-chip reference resistor. The method further comprises the step of calibrating the one or more first master resistors with reference to the at least one on-chip reference resistor. The method further comprises the step of calibrating the one or more first slave resistors with reference to the one or more first master resistors.

Other embodiments of the present invention provide a method for calibrating resistors on an integrated circuit chip via a daisy chain scheme. The method comprises the step of configuring a daisy chain scheme which comprises sequential links, wherein each of the sequential links comprises one or more master resistors and one or more slave resistors on the integrated circuit chip, and wherein one or more slave resistors are located at a distance away from the one or more master resistors. The method further comprises steps of calibrating at least one on-chip reference resistor with reference to at least one off-chip reference resistor. The method further comprises the step of calibrating the one or more master resistors in a first link of the sequential links with reference to the at least one on-chip reference resistor. The method further comprises the step of calibrating the one or more master resistors in each of the sequential links other than the first link, wherein the one or more master resistors in a latter link are calibrated with reference to the one or more slave resistors in a former link which is immediately prior to the latter link. The method further comprises the step of calibrating the one or more slave resistors in each of the sequential links with reference to the one or more master resistors in the same link.

DETAILED DESCRIPTION

The present invention recognizes that standard calibration methods are unable to overcome problems of resistance mismatch due to across chip variation (ACV). In the standard methods, an on-chip reference resistor is calibrated with reference to an off-chip reference resistor and then a calibration code of the on-chip reference resistor is mirrored to all other on-chip resistors. When the across chip variation (ACV) is increased, the standard calibration methods suffer in performance and result in resistor mismatch across the chip. Embodiments of the present invention disclose a method of calibrating on-chip resistors using a daisy chain scheme. In the embodiments, the calibration method using the daisy chain scheme enables resistance of an off-chip high precision reference resistor to be duplicated to multiple distant locations while maintaining a low mismatch error between the off-chip high precision reference resistor and a reference resistor for a distant circuit. In addition, the method of the present invention eliminates the need for extra chip and module pins which are used to mitigate the resistor mismatch due to the across chip variation (ACV).

The calibration method using the daisy chain scheme is described in detail in the following three exemplary embodiments. The foregoing description of various exemplary embodiments of the present invention has been presented for purposes of illustration and description. It is neither intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 1A:
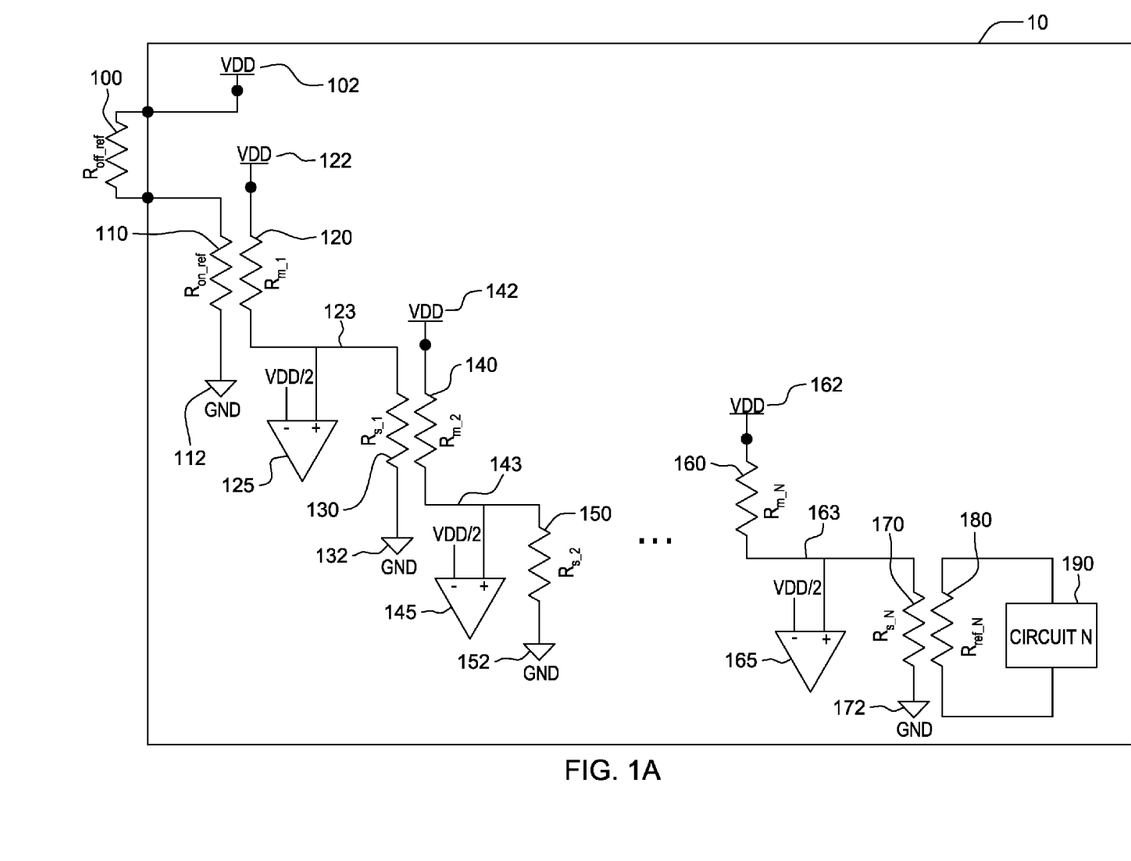
FIG. 1A is a diagram showing a daisy chain scheme for calibrating on-chip resistors in a first exemplary embodiment.

FIG. 1A shows a daisy chain scheme for calibrating on-chip resistors in a first exemplary embodiment. Referring to FIG. 1A, an on-chip reference resistor $R_{on\_ref}$ 110 is a tunable high precision resistor on an integrated circuit (IC) chip 10. On-chip reference resistor $R_{on\_ref}$ 110 is calibrated with reference to an off-chip reference resistor $R_{off\_ref}$ 100 outside IC chip 10. Off-chip reference resistor $R_{off\_ref}$ 100 has a value of high precision resistance which is used as a reference for the calibration of all resistors on IC chip 10. In the first embodiment, the daisy chain scheme comprises multiple sequential links (N links), and each of the multiple sequential links comprises a master resistor and a slave resistor. In each of the multiple sequential links, the slave resistor is calibrated with reference to the master resistor. In the first link of the multiple sequential links, a resistor on IC chip 10 is used as a master resistor $R_{m\_1}$ 120. Master resistor $R_{m\_1}$ 120 is adjacent to on-chip reference resistor $R_{on\_ref}$ 110. For example, master resistor $R_{m\_1}$ 120 and on-chip reference resistor $R_{on\_ref}$ 110 are either interdigitated with or physically close to each other. On IC chip 10, a slave resistor $R_{s\_1}$ 130 in the first link of the sequential links is located at a distance away from master resistor $R_{m\_1}$ 120 in the first link of the multiple sequential links. For example, the distance ranges from 0.5 mm to 10 mm. On IC chip 10, a master resistor $R_{m\_2}$ 140 in the second link of the multiple sequential links is adjacent to slave resistor $R_{s\_1}$ 130 in the first link of the multiple sequential links. For example, master resistor $R_{m\_2}$ 140 and slave resistor $R_{s\_1}$ 130 are either interdigitated with or physically close to each other. On IC chip 10, a slave resistor $R_{s\_2}$ 150 in the second link of the multiple sequential links is located at a distance (e.g. 0.5-10 mm) away from master resistor $R_{m\_2}$ 140 in the second link of the multiple sequential links. The configuration of each of succeeding links (3rd, 4th, . . . , Nth links) is same as the configuration in the second link described above. On IC chip 10, each of the succeeding links has a master resistor and a slave resistor. In the succeeding links, a master resistor in a latter link is adjacent to a slave resistor in a former link that is immediately prior to the latter link. And, in the succeeding links, a slave resistor in one link is located at a distance (e.g. 0.5 mm-10 mm) away from a master resistor in the same link. On IC chip 10 shown in FIG. 1A, the last link (Nth link) has a master resistor $R_{m\_N}$ 160 and a slave resistor $R_{s\_N}$ 170. Slave resistor $R_{s\_N}$ 170 is located at a distance away from master resister $R_{m\_N}$ 160 and adjacent to a reference resistor $R_{ref\_N}$ 180 on IC chip 10. For example, slave resistor $R_{s\_N}$ 170 and reference resistor $R_{ref\_N}$ 180 are either interdigitated with or physically close to each other. Reference resistor $R_{ref\_N}$ 180 is associated with circuit N 190 on IC chip 10 and required for optimal performance of circuit N 190. Reference resistor $R_{ref\_N}$ 180 and circuit N 190 are located at a further distance away from on-chip reference resistor $R_{on\_ref}$ 110. For example, the distance between reference resistor $R_{ref\_N}$ 180 and on-chip reference resistor $R_{on\_ref}$ 110 is more than 20 mm.

Figure 1B:
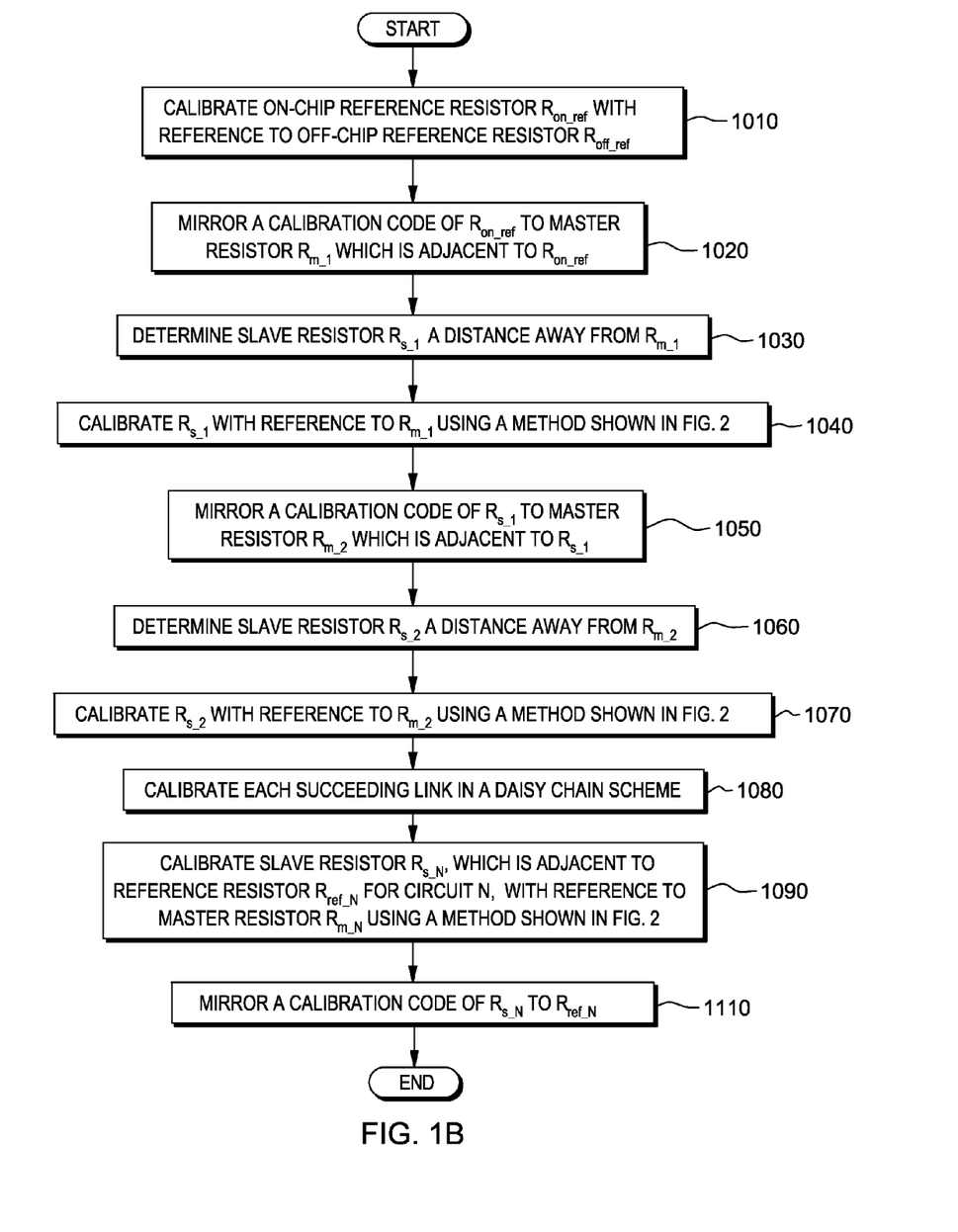
FIG. 1B is a flowchart showing steps of calibrating on-chip resistors via the daisy chain scheme shown in FIG. 1A.

FIG. 1B presents a flowchart showing steps of calibrating on-chip resistors via the daisy chain scheme shown in FIG. 1A. Referring to FIG. 1B, at step 1010, on-chip reference resistor $R_{on\_ref}$ 110 is calibrated with reference to off-chip reference resistor $R_{off\_ref}$ 100. In calibrating on-chip reference resistor $R_{on\_ref}$ 110 at step 1010, off-chip reference resistor $R_{off\_ref}$ 100 is connected to a reference voltage source (VDD) 102 shown in FIG. 1A and on-chip reference resistor $R_{on\_ref}$ 110 is connected to a ground (GND) 112 shown in FIG. 1A. Resistance of on-chip reference resistor $R_{on\_ref}$ 110 is matched to resistance of off-chip resistance $R_{off\_ref}$ 100 by determining the correct number of parallel segments in on-chip reference resistor $R_{on\_ref}$ 110. At step 1010, a calibration code of on-chip reference resistor $R_{on\_ref}$ 110 is set. The calibration code controls the correct number of parallel segments of on-chip reference resistor $R_{on\_ref}$ 110.

Figure 2:
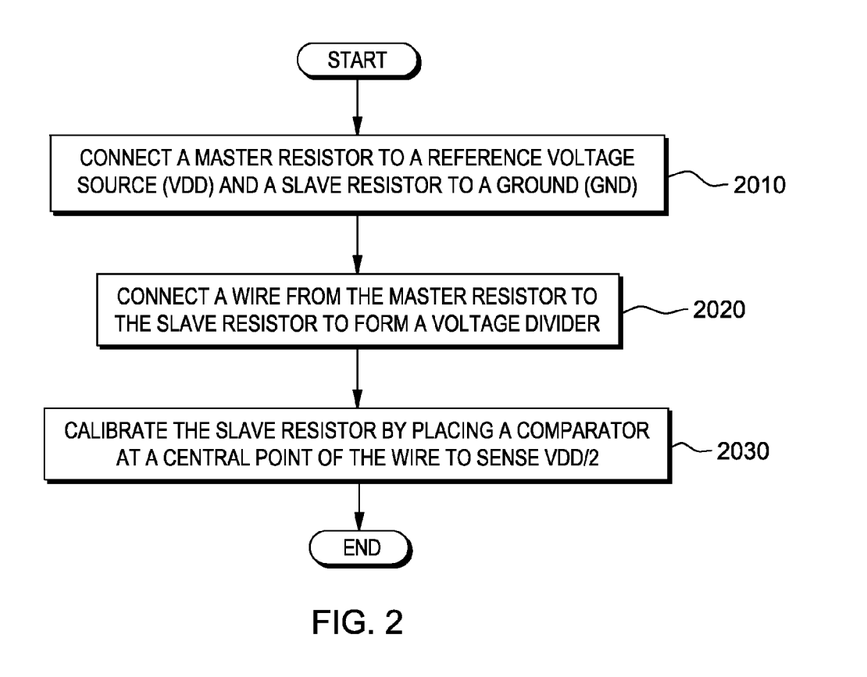
FIG. 2 is a flowchart showing steps of calibrating a slave resistor with reference to a master resistor in each link of the daisy chain scheme.

Referring to FIG. 1B, steps 1020, 1030, and 1040 are the steps of calibration in the first link of the multiple sequential links of the daisy chain scheme. At step 1020, to calibrate master resistor $R_{m\_1}$ 120 in the first link, the calibration code of on-chip reference resistor $R_{on\_ref}$ 110 is mirrored to master resistor $R_{m\_1}$ 120. The adjacency between master resistor $R_{m\_1}$ 120 and on-chip reference resistor $R_{on\_ref}$ 110 allows the calibration code to be mirrored with very little resistance mismatch. At step 1030, slave resistor $R_{s\_1}$ 130 in the first link of the multiple sequential links is determined such that slave resistor $R_{s\_1}$ 130 is located at a distance (e.g. 0.5-10 mm) away from master resistor $R_{m\_1}$ 120 in the same link. At step 1040, slave resistor $R_{s\_1}$ 130 in the first link is calibrated with reference to master resistor $R_{m\_1}$ 120 in the same link, using steps described in FIG. 2. The steps in FIG. 2 are used for calibrating a slave resistor in each link of the multiple sequential links of the daisy chain scheme. To calibrate slave resistor $R_{s\_1}$ 130 at step 1040, steps 2010, 2020, and 2030 in FIG. 2 are processed. At step 2010, master resistor $R_{m\_1}$ 120 in the first link is connected to a reference voltage source (VDD) 122 shown in FIG. 1A and slave resistor $R_{s\_1}$ 130 in the first link is connected to a ground (GND) 132 shown in FIG. 1A. At step 2020, master resistor $R_{m\_1}$ 120 and slave resistor $R_{s\_1}$ 130 are connected by a wire 123 shown in FIG. 1A; thus, a voltage divider is formed. At step 2030, slave resistor $R_{s\_1}$ 130 in the first link is calibrated by placing a comparator 125 shown in FIG. 1A at a central point of wire 123 between master resistor $R_{m\_1}$ 120 and slave resistor $R_{s\_1}$ 130. The purpose of placing comparator 125 at the central point is to equalize wire resistance from comparator 125 to master resistor $R_{m\_1}$ 120 and wire resistance from comparator 125 to slave resistor $R_{s\_1}$ 130. The voltage sensed by comparator 125 is VDD/2 when resistance of slave resistor $R_{s\_1}$ 130 matches resistance of master resistor $R_{m\_1}$ 120. Through step 2030, a calibration code of slave resistor $R_{s\_1}$ 130 is set.

Referring to FIG. 1B, steps 1050, 1060, and 1070 are the steps of calibration in the second link of the multiple sequential links of the daisy chain scheme. After slave resistor $R_{s\_1}$ 130 in the first link is calibrated at step 1040, at step 1050, the calibration code of slave resistor $R_{s\_1}$ 130 in the first link is mirrored to master resistor $R_{m\_2}$ 140 in the second link of the multiple sequential links. The adjacency between master resistor $R_{m\_2}$ 140 in the second link and slave resistor $R_{s\_1}$ 130 in the first link allows the calibration code to be mirrored with very little resistance mismatch. At step 1060, slave resistor $R_{s\_2}$ 150 in the second link of the multiple sequential links is determined such that slave resistor $R_{s\_2}$ 150 in the second link is located at a distance (e.g. 0.5-10 mm) away from master resistor $R_{m\_2}$ 140 in the same link. At step 1070, salve resistor $R_{s\_2}$ 150 in the second link is calibrated with reference to master resistor $R_{m\_2}$ 140 in the same link. For calibrating slave resistor $R_{s\_2}$ 150 at step 1070, steps 2010, 2020, and 2030 in FIG. 2 are processed. At step 2010, master resistor $R_{m\_2}$ 140 in the second link is connected to a reference voltage source (VDD) 142 shown in FIG. 1A and slave resistor $R_{s\_2}$ 150 in the second link is connected to a ground (GND) 152 shown in FIG. 1A. At step 2020, master resistor $R_{m\_2}$ 140 and slave resistor $R_{s\_2}$ 150 are connected by a wire 143 shown in FIG. 1A to form a voltage divider. At step 2030, resistance of slave resistor $R_{s\_2}$ 150 is matched to resistance of master resistor $R_{m\_2}$ 140 by placing a comparator 145 shown in FIG. 1A at a central point of wire 143 to sense the voltage of VDD/2. Placing comparator 145 at the central point between master resistor $R_{m\_2}$ 140 and slave resistor $R_{s\_2}$ 150 ensures that wire resistance between comparator 145 and master resistor $R_{m\_2}$ 140 and wire resistance between comparator 145 and slave resistor $R_{s\_2}$ 150 are equal. Through step 2030, a calibration code of slave resistor $R_{s\_2}$ 150 is set.

After the steps of calibration in the second link, calibration in each of succeeding links (i.e. links 3, 4, ..., N) is processed, which is summarily presented by step 1080 in FIG. 1B. Same as the calibration in the second link, the calibration of each of succeeding links (i.e. links 3, 4, ..., N) follows steps: to minor a calibration code of a slave resistor in a former link, which is immediately prior to a latter link, to a master resistor in the latter link; to determine a slave resistor in the latter link such that the slave resistor in the latter link is located at a distance (e.g. 0.5-10 mm) away from the master resistor in the latter link; and to calibrate the slave resistor in the latter link with reference to the master resistor in the latter link.

In the Nth link, after master resistor $R_{m\_N}$ 160 is calibrated by mirroring a calibration code of a slave resistor in the (N−1)th link, slave resistor $R_{s\_N}$ 170 is calibrated with reference to master resistor $R_{m\_N}$ 160 (at step 1090). For calibrating slave resistor $R_{s\_N}$ 170 at step 1090, steps 2010, 2020, and 2030 in FIG. 2 are processed. According to step 2010 in FIG. 2, master resistor $R_{m\_N}$ 160 is connected to a reference voltage source (VDD) 162 shown in FIG. 1A and slave resistor $R_{s\_N}$ 170 is connected to a ground (GND) 172 shown in FIG. 1A. According to step 2020 in FIG. 2, master resistor $R_{m\_N}$ 160 and slave resistor $R_{s\_N}$ 170 are connected by a wire 163 shown in FIG. 1A to form a voltage divider. According to step 2030 in FIG. 2, a comparator 165 shown in FIG. 1A is placed at a central point of wire 163 between master resistor $R_{m\_N}$ 160 and slave resistor $R_{s\_N}$ 170; then, slave resistor $R_{s\_N}$ 170 is calibrated by sensing the voltage of VDD/2. Because comparator 165 is placed at the central point, wire resistance between comparator 165 and master resistor $R_{m\_N}$ 160 equals wire resistance between comparator 165 and slave resistor $R_{s\_N}$ 170. Through step 2030, a calibration code of slave resistor $R_{s\_N}$ 170 is set. Referring to FIG. 1B, at step 1110, the calibration code of slave resistor $R_{s\_N}$ 170 is mirrored to reference resistor $R_{ref\_N}$ 180.

In the first exemplary embodiment, by implementing the method of calibration via the multiple sequential links in the daisy chain scheme, resistance of off-chip reference resistor $R_{off\_ref}$ 100 is duplicated to reference resistor $R_{ref\_N}$ 180 of circuit N 190 which is located at a further distance (e.g. 20 mm or more) away from on-chip reference resistor $R_{on\_ref}$ 110. While resistance of off-chip reference resistor $R_{off\_ref}$ 100 is duplicated to a distant site on IC chip 10, the method via the multiple sequential links in the daisy chain scheme can maintain a low mismatch error between off-chip reference resistor $R_{off\_ref}$ 100 and reference resistor $R_{ref\_N}$ 180 of circuit N 190.

In standard methods of calibrating on-chip resistors, extra chip and module connection pins of an IC chip are required to overcome resistance mismatch due to the across chip variation (ACV). However, the method in the present invention eliminates the need for the extra chip and module pins, thus reducing the chip and module input/output (I/O) count.

In other embodiments, any link of the multiple sequential links may have multiple master resistors and multiple slave resistors, wherein respective ones of the multiple slave resistors are calibrated with reference to respective ones of the multiple master resistors. In addition, any link of the multiple sequential links in the daisy chain scheme may have a master resistor and multiple slave resistors, wherein each of the multiple slave resistors is calibrated with reference to the master resistor. In these scenarios, the respective ones of the multiple master resistors and the respective ones of the multiple slave resistors are used to calibrate respective multiple reference resistors of respective multiple circuits on an IC chip.

Figure 3A:
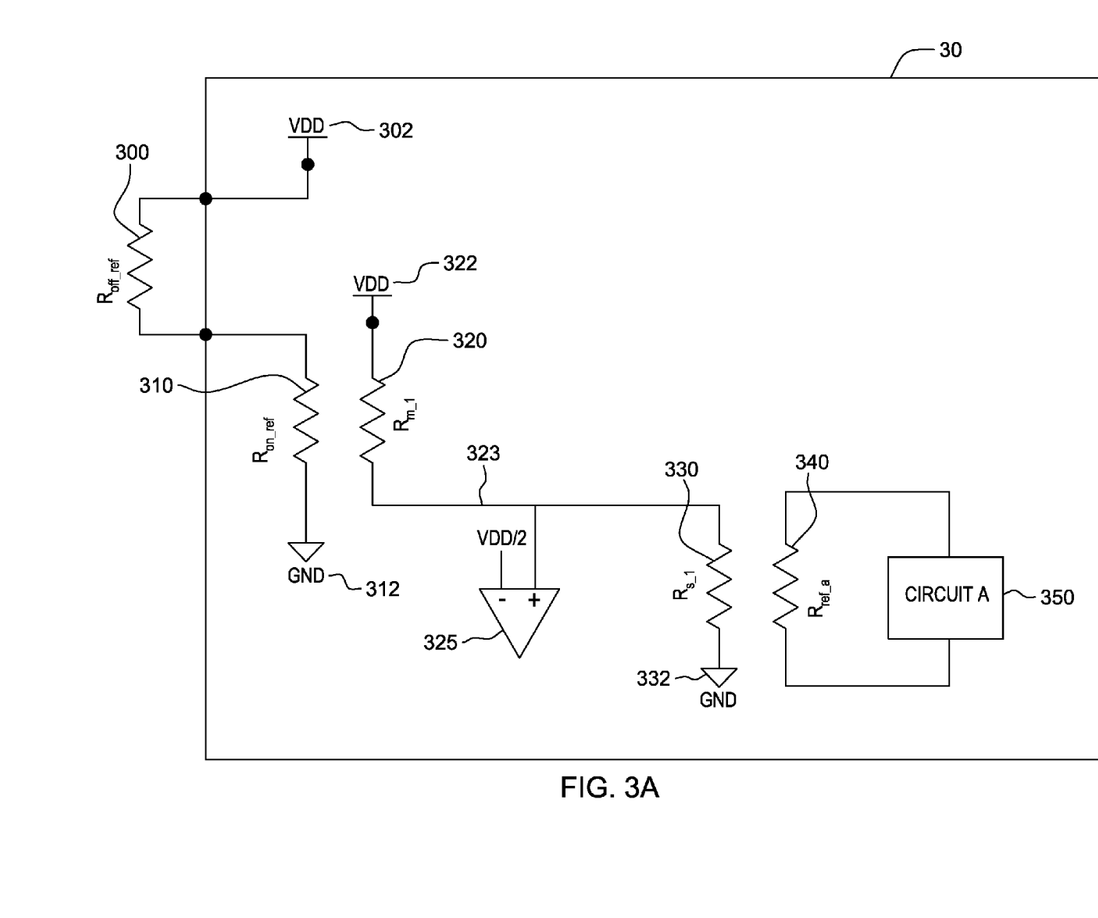
FIG. 3A is a diagram showing a daisy chain scheme for calibrating on-chip resistors in a second exemplary embodiment.

FIG. 3A is a diagram showing a daisy chain scheme for calibrating on-chip resistors in a second exemplary embodiment. In FIG. 3A, an on-chip reference resistor $R_{on\_ref}$ 310 on an integrated circuit (IC) chip 30 is a tunable high precision resistor. On-chip reference resistor $R_{on\_ref}$ 310 is calibrated with reference to an off-chip reference resistor $R_{off\_ref}$ 300 which is outside IC chip 30. Off-chip reference resistor $R_{off\_ref}$ 300 has a value of high precision resistance which is used as a reference for the calibration of all resistors on IC chip 30. A resistor on IC chip 30 adjacent to on-chip reference resistor $R_{on\_ref}$ 310 is used as a master resistor $R_{m\_1}$ 320. For example, on-chip reference resistor $R_{on\_ref}$ 310 and master resistor $R_{m\_1}$ 320 are either interdigitated with or physically close to each other. On IC chip 30, a resistor which is located at a distance (e.g. 0.5-10 mm) away from master resistor $R_{m\_1}$ 320 and adjacent to a reference resistor $R_{ref\_a}$ 340 is used as a slave resistor $R_{s\_1}$ 330. For example, slave resistor $R_{s\_1}$ 330 and reference resistor $R_{ref\_a}$ 340 are either interdigitated with or physically close to each other. Reference resistor $R_{ref\_a}$ 340 is associated with circuit A 350 on IC chip 30 and required for optimal performance of circuit A 350. Reference resistor $R_{ref\_a}$ 340 is located at a distance away from on-chip reference resistor $R_{on\_ref}$ 310; for example, the distance ranges from 0.5 mm to 10 mm.

Figure 3B:
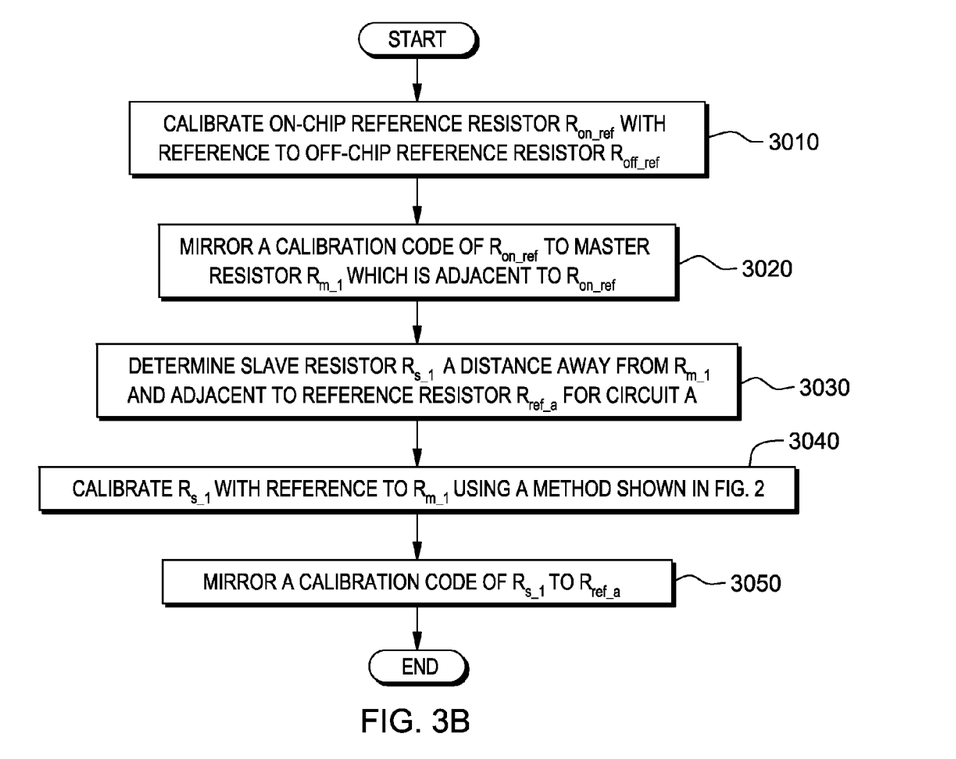
FIG. 3B is a flowchart showing steps of calibrating on-chip resistors via the daisy chain scheme shown in FIG. 3A.

FIG. 3B is a flowchart showing steps of calibrating on-chip resistors via the daisy chain scheme shown in FIG. 3A. At step 3010, on-chip reference resistor $R_{on\_ref}$ 310 is calibrated with reference to off-chip reference resistor $R_{off\_ref}$ 300. In the calibration of on-chip reference resistor $R_{on\_ref}$ 310, off-chip reference resistor $R_{off\_ref}$ 300 is connected to a reference voltage source (VDD) 302 shown in FIG. 3A and on-chip reference resistor $R_{on\_ref}$ 310 is connected to a ground (GND) 312 shown in FIG. 3A. The correct number of parallel segments in on-chip reference resistor $R_{on\_ref}$ 310 is set to match resistance of on-chip reference resistor $R_{on\_ref}$ 310 to resistance of off-chip reference resistor $R_{off\_ref}$ 300. A calibration code, which controls the correct number of parallel segments of on-chip reference resistor $R_{on\_ref}$ 310, is set at step 3010. At step 3020, the calibration code of on-chip reference resistor $R_{on\_ref}$ 310 is mirrored to master resistor $R_{m\_1}$ 320. The adjacency between master resistor $R_{m\_1}$ 320 and on-chip reference resistor $R_{on\_ref}$ 310 allows the calibration code to be mirrored with very little resistance mismatch. At step 3030, slave resistor $R_{s\_1}$ 330 is determined such that slave resistor $R_{s\_1}$ 330 is located at a distance (e.g. 0.5-10 mm) away from master resistor $R_{m\_1}$ 320 and adjacent to reference resistor $R_{ref\_a}$ 340 of circuit A 350. At step 3040, slave resistor $R_{s\_1}$ 330 is calibrated with reference to master resistor $R_{m\_1}$ 320, using steps 2010, 2020, and 2030 in FIG. 2. At step 2010, master resistor $R_{m\_1}$ 320 is connected to a reference voltage source (VDD) 322 shown in FIG. 3A and slave resistor $R_{s\_1}$ 330 is connected to a ground (GND) 332 shown in FIG. 3A. At step 2020, a wire 323 shown in FIG. 3A connects master resistor $R_{m\_1}$ 320 and slave resistor $R_{s\_1}$ 330, thus forming a voltage divider. At step 2030, slave resistor $R_{s\_1}$ 330 is calibrated by placing a comparator 325 shown in FIG. 1A at a central point of wire 323 between master resistor $R_{m\_1}$ 320 and slave resistor $R_{s\_1}$ 330 to sense the voltage of VDD/2. Comparator 325 is placed at the central point so that the wire resistance between comparator 325 and master resistor $R_{m\_1}$ 320 equals resistance between comparator 325 and slave resistor $R_{s\_1}$ 330. Through step 2030, a calibration code of slave resistor $R_{s\_1}$ 330 is set. At step 3050, the calibration code of slave resistor $R_{s\_1}$ 330 is mirrored to reference resistor $R_{ref\_a}$ 340.

In the second exemplary embodiment, resistance of off-chip reference resistor $R_{off\_ref}$ 300 is duplicated to reference resistor $R_{ref\_a}$ 340 of circuit A 350 which is located at a distance away from on-chip reference resistor $R_{on\_ref}$ 310. For example, reference resistor $R_{ref\_a}$ 340 of circuit A 350 is located at 0.5-10 mm away from on-chip reference resistor $R_{on\_ref}$ 310.

Figure 4A:
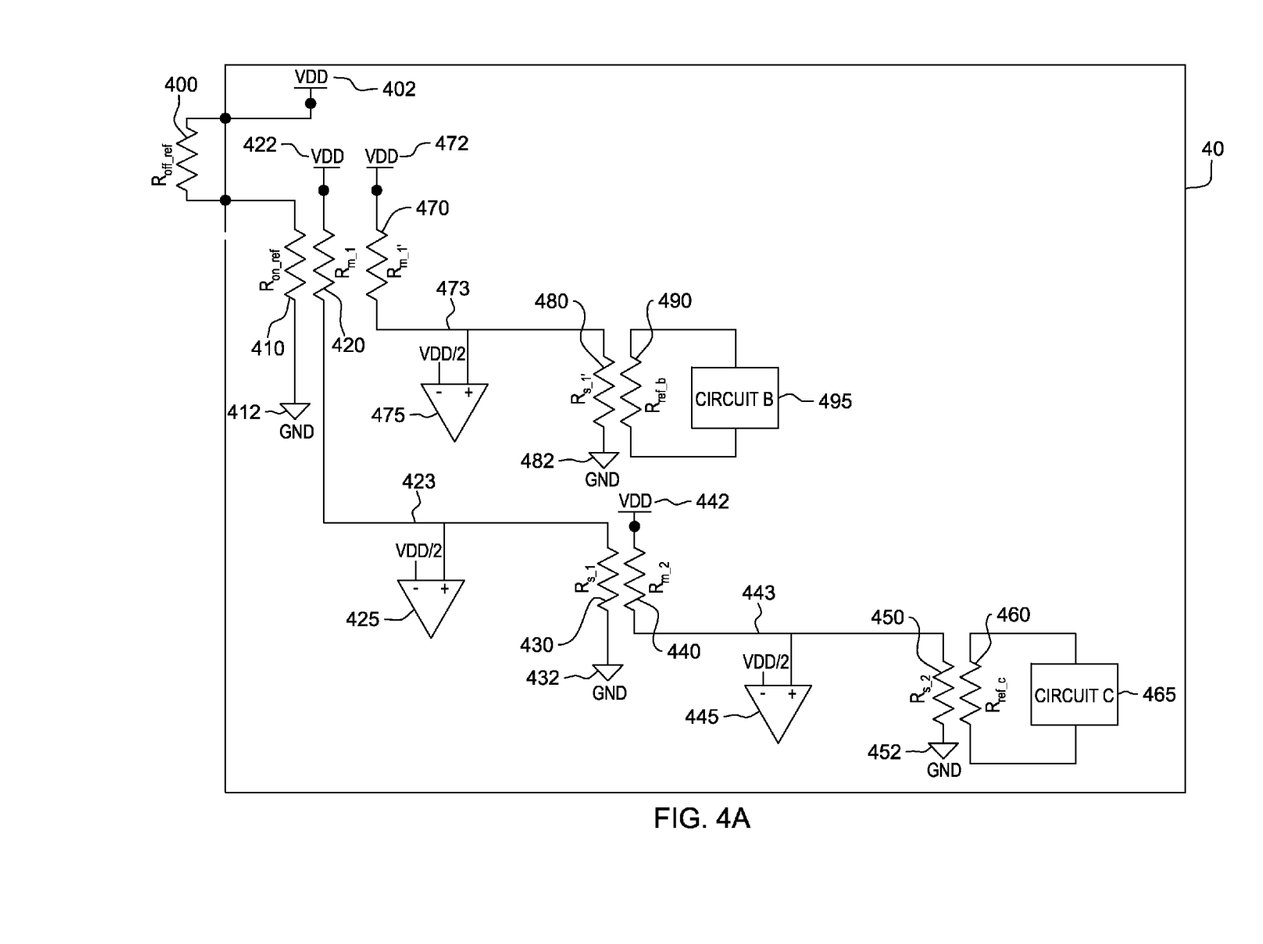
FIG. 4A is a diagram showing a daisy chain scheme for calibrating on-chip resistors in a third exemplary embodiment.

FIG. 4A is a diagram showing a daisy chain scheme for calibrating on-chip resistors in a third exemplary embodiment. An integrated circuit (IC) chip 40 has an on-chip reference resistor $R_{on\_ref}$ 410. An off-chip reference resistor $R_{off\_ref}$ 400 outside IC chip 40 is used to calibrate on-chip reference resistor $R_{on\_ref}$ 410. In a first link of sequential links in the daisy chain scheme, two master resistors $R_{m\_1}$ 420 and $R_{m\_1'}$ 470 on IC chip 40 are adjacent to on-chip reference resistor $R_{on\_ref}$ 410. For example, master resistor $R_{m\_1}$ 420 and master resistor $R_{m\_1'}$ 470 are either interdigitated with or physically close to on-chip reference resistor $R_{on\_ref}$ 410. In the first link of sequential links, there are two slave resistors $R_{s\_1}$ 430 and $R_{s\_1'}$ 480 on IC chip 40. Slave resistor $R_{s\_1}$ 430 is located at a distance (e.g. ranging from 0.5 mm to 10 mm) away from master resistor $R_{m\_1}$ 420. Slave resistor $R_{s\_1'}$ 480 is located at a distance (e.g. ranging from 0.5 mm to 10 mm) away from master resistor $R_{m\_1'}$ 470. Slave resistor $R_{s\_1'}$ 480 is also adjacent to a reference resistor $R_{ref\_b}$ 490 on IC chip 40. For example, slave resistor $R_{s\_1'}$ 480 is either interdigitated with or physically close to reference resistor $R_{ref\_b}$ 490. Reference resistor $R_{ref\_b}$ 490 is associated with circuit B 495 on IC chip 40 and required for optimal performance of circuit B 495. Reference resistor $R_{ref\_b}$ 490 is a distance (e.g. ranging from 0.5 mm to 10 mm) away from on-chip reference resistor $R_{on\_ref}$ 410.

Referring to FIG. 4A, in a second link of the sequential links in the daisy chain scheme, a master resistor $R_{m\_2}$ 440 on IC chip 40 is adjacent to slave resistor $R_{s\_1}$ 430 in the first link; for example, both master resistor $R_{m\_2}$ 440 and slave resistor $R_{s\_1}$ 430 are interdigitated with or physically close to each other. On IC chip 40, a slave resistor $R_{s\_2}$ 450 in the second link is located at a distance (e.g. ranging from 0.5 mm to 10 mm) away from master resistor $R_{m\_2}$ 440 in the same link. Slave resistor $R_{s\_2}$ 450 is also adjacent to a reference resistor $R_{ref\_c}$ 460 on IC chip 40; for example, slave resistor $R_{s\_2}$ 450 is interdigitated with or physically close to reference resistor $R_{ref\_c}$ 460. Reference resistor $R_{ref\_c}$ 460 is associated with circuit C 465 on IC chip 40 and required for optimal performance of circuit C 465. Reference resistor $R_{ref\_c}$ 460 is located at a further distance away from on-chip reference resistor $R_{on\_ref}$ 410; for example, the distance ranges from 10 mm to 20 mm.

Figure 4B:
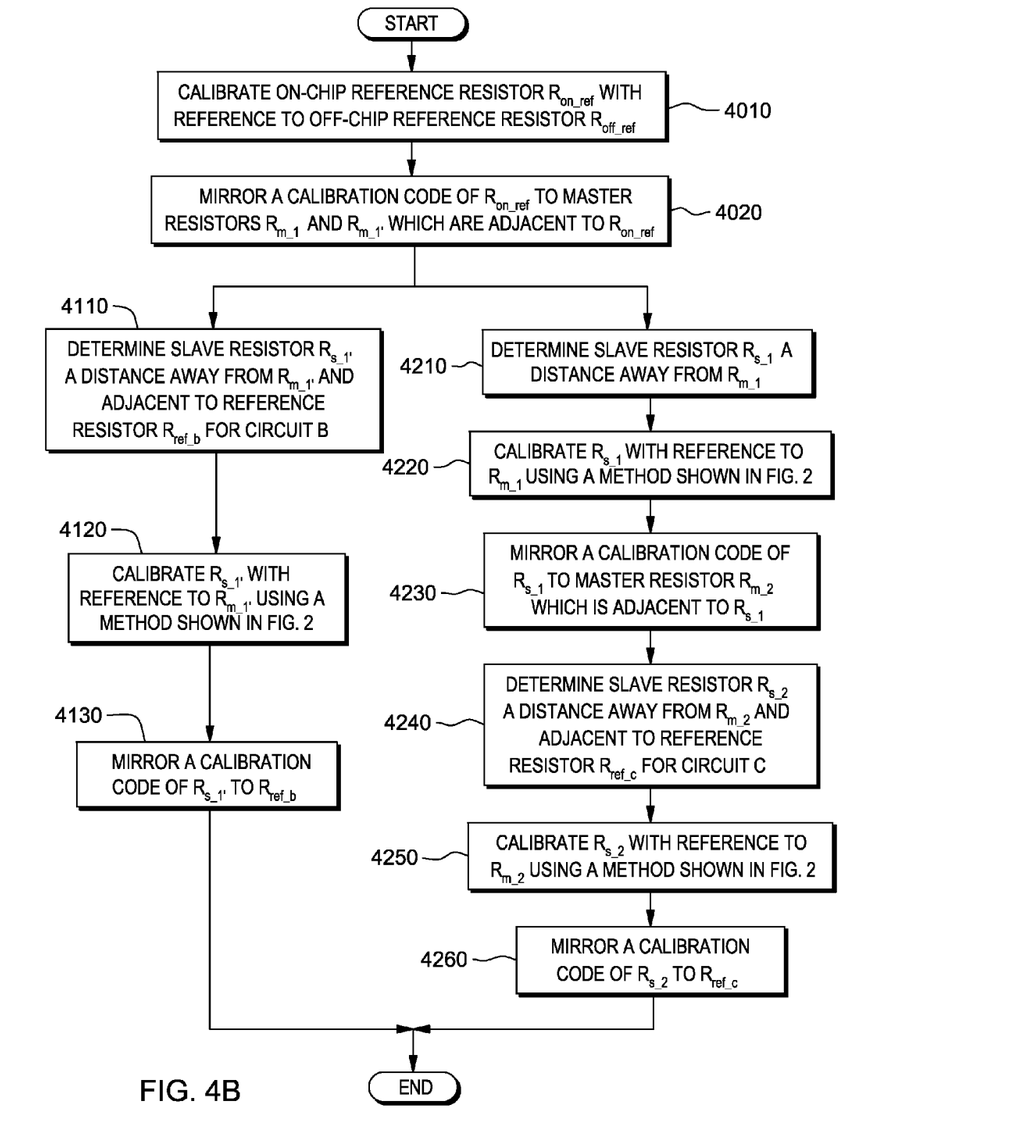
FIG. 4B is a flowchart showing steps of calibrating on-chip resistors via the daisy chain scheme shown in FIG. 4A.

FIG. 4B is a flowchart showing steps of calibrating on-chip resistors via the daisy chain scheme shown in FIG. 4A. Referring to FIG. 4B, at step 4010, on-chip reference resistor $R_{on\_ref}$ 410 is calibrated with reference to off-chip reference resistor $R_{off\_ref}$ 400. For calibrating on-chip reference resistor $R_{on\_ref}$ 410 at step 4010, off-chip reference resistor $R_{off\_ref}$ 400 is connected to a reference voltage source (VDD) 402 shown in FIG. 4A, and on-chip reference resistor $R_{on\_ref}$ 410 is connected to a ground (GND) 412 shown in FIG. 4A. Resistance of on-chip reference resistor $R_{on\_ref}$ 410 is matched to resistance of off-chip reference resistor $R_{off\_ref}$ 400 by determining the correct number of parallel segments in on-chip reference resistor $R_{on\_ref}$ 410. A calibration code, which controls the correct number of parallel segments of on-chip reference resistor $R_{on\_ref}$ 410, is set at step 4010.

At step 4020, to calibrate master resistors $R_{m\_1}$ 420 and $R_{m\_1'}$ 470, the calibration code of on-chip reference resistor $R_{on\_ref}$ 410 is mirrored to both master resistors $R_{m\_1}$ 420 and $R_{m\_1'}$ 470. Because master resistors $R_{m\_1}$ 420 and $R_{m\_1'}$ 470 are interdigitated with or physically close to on-chip reference resistor $R_{on\_ref}$ 410, the calibration code is mirrored with very little resistance mismatch. Referring to FIG. 4B, reference resistor $R_{ref\_b}$ 490 of circuit B 495 is calibrated through steps 4110, 4120, and 4130. At step 4110, slave resistor $R_{s\_1'}$ 480 is determined such that it is located at a distance (e.g. 0.5-10 mm) away from master resistor $R_{m\_1'}$ 470 and adjacent to reference resistor $R_{ref\_b}$ 490 of circuit B 495. At step 4120, slave resistor $R_{s\_1'}$ 480 is calibrated with reference to master resistor $R_{m\_1'}$ 470, using steps 2010, 2020, and 2030 shown in FIG. 2. According to step 2010 in FIG. 2, master resistor $R_{m\_1'}$ 470 is connected to a reference voltage source (VDD) 472 shown in FIG. 4A and slave resistor $R_{s\_1'}$ 480 is connected to a ground (GND) 482 shown in FIG. 4A. According to step 2020 in FIG. 2, a wire 473 shown in FIG. 4A connects master resistor $R_{m\_1'}$ 470 and slave resistor $R_{s\_1'}$ 480, thus forming a voltage divider. According to step 2030 in FIG. 2, to calibrate slave resistor $R_{s\_1'}$ 480, a comparator 475 shown in FIG. 4A is placed at a central point of wire 473 between master resistor $R_{m\_1'}$ 470 and slave resistor $R_{s\_1'}$ 480 to sense the voltage of VDD/2. Because comparator 475 is placed at the central point, wire resistance between comparator 475 and master resistor $R_{m\_1'}$ 470 equals wire resistance between comparator 475 and slave resistor $R_{s\_1'}$ 480. Through step 2030, a calibration code of slave resistor $R_{s\_1'}$ 480 is set. At step 4130, the calibration code of slave resistor $R_{s\_1'}$ 480 is mirrored to reference resistor $R_{ref\_b}$ 490. Thus, reference resistor $R_{ref\_b}$ 490 of circuit B 495 is calibrated via the daisy chain scheme. With the daisy chain scheme, resistance of off-chip reference resistor $R_{off\_ref}$ 400 is duplicated to reference resistor $R_{ref\_b}$ 490 of circuit B 495 which is located at a distance (e.g. 0.5 mm-10 mm) away from on-chip reference resistor $R_{on\_ref}$ 410.

Referring to FIG. 4B, reference resistor $R_{ref\_c}$ 460 of circuit C 465 is calibrated through steps 4210, 4220, 4230, 4240, 4250, and 4260. Steps 4210 and 4220 are the steps of determining and calibrating slave resistor $R_{s\_1}$ 430 in the first link of the sequential links in the daisy chain scheme. At step 4210, slave resistor $R_{s\_1}$ 430 is determined such that slave resistor $R_{s\_1}$ 430 is located at a distance (e.g. 0.5 mm-10 mm) away from master resistor $R_{m\_1}$ 420. At step 4220, slave resistor $R_{s\_1}$ 430 is calibrated with reference to master resistor $R_{m\_1}$ 420, using steps 2010, 2020, and 2030 shown in FIG. 2. According to step 2010 in FIG. 2, master resistor $R_{m\_1}$ 420 is connected to a reference voltage source (VDD) 422 shown in FIG. 4A and slave resistor $R_{s\_1}$ 430 is connected to a ground (GND) 432 shown in FIG. 4A. According to step 2020 in FIG. 2, a wire 423 shown in FIG. 4A connects master resistor $R_{m\_1}$ 420 and slave resistor $R_{s\_1}$ 430, thus forming a voltage divider. According to step 2030 in FIG. 2, to calibrate slave resistor $R_{s\_1}$ 430, a comparator 425 shown in FIG. 4A is placed at a central point of wire 423 between master resistor $R_{m\_1}$ 420 and slave resistor $R_{s\_1}$ 430 to sense the voltage of VDD/2. Because comparator 425 is placed at the central point, wire resistance between comparator 425 and master resistor $R_{m\_1}$ 420 equals wire resistance between comparator 425 and slave resistor $R_{s\_1}$ 430. Through step 2030, a calibration code of slave resistor $R_{s\_1}$ 430 is set.

Referring to FIG. 4B, steps 4230, 4240, and 4250 are the steps of calibrating master resistor $R_{m\_2}$ 440 and slave resistor $R_{s\_2}$ 450 in the second link of the sequential links in the daisy chain scheme. At step 4230, to calibrate master resistor $R_{m\_2}$ 440 in the second link, the calibration code of slave resistor $R_{s\_1}$ 430 in the first link is mirrored to master resistor $R_{m\_2}$ 440. At step 4240, slave resistor $R_{s\_2}$ 450 in the second link is determined such that it is located at a distance (e.g. 0.5 mm-10 mm) away from master resistor $R_{m\_2}$ 440 and adjacent to reference resistor $R_{ref\_c}$ 460 of circuit C 465. At step 4250, slave resistor $R_{s\_2}$ 450 in the second link is calibrated with reference to master resistor $R_{m\_2}$ 440 in the same link, using steps 2010, 2020, and 2030 shown in FIG. 2. At step 2010, master resistor $R_{m\_2}$ 440 is connected to a reference voltage source (VDD) 442 shown in FIG. 4A and slave resistor $R_{s\_2}$ 450 is connected to a ground (GND) 452 shown in FIG. 4A. At step 2020, a wire 443 shown in FIG. 4A connects master resistor $R_{m\_2}$ 440 and slave resistor $R_{s\_2}$ 450, thus forming a voltage divider. At step 2030, to calibrate slave resistor $R_{s\_2}$ 450, a comparator 445 shown in FIG. 4A is placed at a central point of wire 443 between master resistor $R_{m\_2}$ 440 and slave resistor $R_{s\_2}$ 450 to sense the voltage of VDD/2. Comparator 445 is placed at the central point so that wire resistance between comparator 445 and master resistor $R_{m\_2}$ 440 equals wire resistance between comparator 445 and slave resistor $R_{s\_2}$ 450. Through step 2030, a calibration code of slave resistor $R_{s\_2}$ 450 is set.

Referring to FIG. 4B, at step 4260, the calibration code of slave resistor $R_{s\_2}$ 450 is mirrored to reference resistor $R_{ref\_c}$ 460 of circuit C 465. Thus, with the calibration method via the daisy chain scheme, resistance of off-chip reference resistor $R_{off\_ref}$ 400 is duplicated to reference resistor $R_{ref\_c}$ 460 of circuit C 465 which is located at a further distance (e.g. 10 mm-20 mm) away from on-chip reference resistor $R_{on\_ref}$ 410.

In the third exemplary embodiment, with the calibration method via the daisy chain scheme, resistance of off-chip reference resistor $R_{off\_ref}$ 400 is duplicated to two reference resistors $R_{ref\_b}$ 490 and $R_{ref\_c}$ 460 respectively for two circuits B 495 and C 465 which are respectively located at two sites on IC chip 40.

Based on the foregoing, a method has been disclosed for calibrating on-chip resistors on an integrated circuit chip via a daisy chain scheme. However, numerous modifications and substitutions can be made without deviating from the sprit and scope of the present invention. Therefore, the present invention has been disclosed by way of examples and not limitation.

What is claimed is:

1. A method of calibrating resistors on an integrated circuit chip, the method comprising:
    configuring a link of a daisy chain scheme, wherein the link comprises, on the integrated circuit chip, one or more first master resistors and one or more first slave resistors located at a distance away therefrom;
    calibrating at least one on-chip reference resistor with reference to at least one off-chip reference resistor;
    calibrating the one or more first master resistors with reference to the at least one on-chip reference resistor; and
    calibrating the one or more first slave resistors with reference to the one or more first master resistors.

2. The method of claim 1, wherein the one or more first master resistors and the at least one on-chip reference resistor are adjacent in such a way that the one or more first master resistors are interdigitated with or physically close to the at least one on-chip reference resistor.

3. The method of claim 1, wherein the one or more first master resistors are calibrated by mirroring a calibration code of the at least one on-chip reference resistor.

4. The method of claim 1, wherein calibrating the one or more first slave resistors further comprises:
    connecting respective ones of the one or more first master resistors to at least one reference voltage source;
    connecting respective ones of the one or more first slave resistors to a ground;
    connecting wires from the respective ones of the one or more first slave resistors to the respective ones of the one or more first master resistors;
    placing a comparator at a central point along each of the wires; and
    matching resistance of the respective ones of the one or more first slave resistors to resistance of the respective ones of the one or more first master resistors.

5. The method of claim 1, the method further comprising:
    configuring succeeding sequential links following the link, wherein each of the succeeding sequential links comprises, on the integrated circuit chip, one or more master resistors and one or more slave resistors located at a distance away therefrom;
    calibrating the one or more master resistors in each of the succeeding sequential links, wherein the one or more master resistors in a latter link are calibrated with reference to the one or more slave resistors in a former link immediately prior to the latter link; and
    calibrating, in each of the succeeding sequential links, the one or more slave resistors with reference to the one or more master resistors.

6. The method of claim 5, wherein the one or more master resistors in the latter link and the one or more slave resistors in the former link are adjacent in such a way that the one or more master resistors in the latter link are interdigitated with or physically close to the one or more slave resistors in the former link.

7. The method of claim 5, wherein the one or more master resistors in the latter link are calibrated by mirroring a calibration code of the one or more salve resistors in the former link.

8. The method of claim 5, wherein calibrating the one or more slave resistors in each of the succeeding sequential links further comprises:
    connecting respective ones of the one or more master resistors to at least one reference voltage source;
    connecting respective ones of the one or more slave resistors to a ground;
    connecting wires from the respective ones of the one or more slave resistors to the respective ones of the one or more master resistors;
    placing a comparator at a central point along each of the wires; and
    matching resistance of the respective ones of the one or more slave resistors to resistance of the respective ones of the one or more master resistors.

9. A method of calibrating resistors on an integrated circuit chip, the method comprising:
    configuring a daisy chain scheme which comprises sequential links each comprising, on the integrated circuit chip, one or more master resistors and one or more slave resistors located at a distance away therefrom;
    calibrating at least one on-chip reference resistor with reference to at least one off-chip reference resistor;
    calibrating the one or more master resistors in a first link of the sequential links with reference to the at least one on-chip reference resistor;
    calibrating the one or more master resistors in each of the sequential links other than the first link, wherein the one or more master resistors in a latter link are calibrated with reference to the one or more slave resistors in a former link immediately prior to the latter link; and calibrating, in each of the sequential links, the one or more slave resistors with reference to the one or more master resistors.

10. The method of claim 9, wherein the one or more master resistors in the first link and the at least one on-chip reference resistor are adjacent in such a way that the one or more master resistors in the first link are interdigitated with or physically close to the at least one on-chip reference resistor.

11. The method of claim 9, wherein the one or more master resistors in the latter link and the one or more slave resistors in the former link are adjacent in such a way that the one or more master resistors in the latter link are interdigitated with or physically close to the one or more slave resistors in the former link.

12. The method of claim 9, wherein the one or more master resistors in the first link of the sequential links are calibrated by mirroring a calibration code of the at least one on-chip reference resistor.

13. The method of claim 9, wherein the one or more master resistors in the latter link are calibrated by mirroring a calibration code of the one or more salve resistors in the former link.

14. The method of claim 9, wherein calibrating the one or more slave resistors in each of the sequential links further comprises:
  connecting respective ones of the one or more master resistors to at least one reference voltage source;
  connecting respective ones of the one or more slave resistors to a ground;
  connecting wires from the respective ones of the one or more slave resistors to the respective ones of the one or more master resistors;
  placing a comparator at a central point along each of the wires; and
  matching resistance of the respective ones of the one or more slave resistors to resistance of the respective ones of the one or more master resistors.

* * * * *